2,790,003
BASIC POLYGLYCOL ETHERS

Jakob Bindler, Riehen, near Basel, Switzerland, assignor to J. R. Geigy A. G., Basel, Switzerland, a Swiss firm No Drawing. Application September 2, 1954, Serial No. 453,945

Claims priority, application Switzerland September 24, 1953

5 Claims. (Cl. 260—584)

The present invention concerns the production of basic polyglycol ethers which have an excellent levelling action on dyeing wool with acid wool dyestuffs in acid dyebaths. In other cases also they have further valuable properties.

It has been found that condensation products obtained by methods known per se from mineral acid esters of saturated fatty alcohols having from 16–18 carbon atoms and an excess of alkylene polyamines can be converted into very valuable basic polyglycol ethers by reacting with 15 to 20 mols of ethylene oxide.

By mineral acid esters of fatty alcohols are meant hexadecanol and, advantageously octadecanol sulphate, or hexadecyl and, preferably, octodecyl chloride or bromide. Usable alkylene polyamines are in particular the ethylene polyamines, e. g. ethylene diamine and preferably diethylene triamine, if desired also however, triethylene tetramine or tetra-ethylene pentamine. The mineral acid esters of the fatty alcohols are condensed with an excess of alkylene polyamines, either in the presence of inert organic solvents or often with advantage by melting the components direct at a raised temperature. The insoluble mineral acid salts and the excess alkylene polyamine are separated from the reaction products, the latter advantageously by distillation in the vacuum. The reaction temperature depends on the reactivity of the mineral acid esters of the fatty alcohols used and lies in the range between 80 and 200° C. Temperatures of, for example 80 to 140° for the condensation of alkyl halides and 150–200° for the condensation of alkyl sulphates are advantageous.

The mono-octodecyl or hexadecyl ethylene polyamines so obtained are then treated as a melt by methods known per se with ethylene oxide in the presence of slight amounts of strong basic catalysts such as caustic alkalies or alkali alcoholates. The reaction is performed in a closed vessel while excluding air until the desired amount of from 15 to 20 mol is taken up; it is advantageous to work at temperatures of 120–140°. With ethylene diamine condensation products of sterol advantageously 20 mol and with sterol condensation products of diethylene triamine 15 mol of ethylene oxide are used.

The basic polyglycol ethers according to the present invention are obtained as light to yellowish waxy masses which dissolve completely in water. When dyeing wool in acid dyebaths with acid dyestuffs, in particular when dyeing with the so-called milling dyestuffs which have poor levelling powers but are greatly valued because of their good wet fastness properties, they have an excellent levelling action. They can also be used as stripping agents for unevenly dyed wool dyeings and also, in weakly alkaline, neutral to weakly acid dyebaths as levelling agents as is usual when dyeing wool with complex heavy metal compounds of such monoazo and azo methine dyestuffs which contain no sulphonic acid groups. The retarding action for milling dyestuffs and the complete absence of dyestuff precipitates, which are greatly feared because they cause spots on the dye material and smear the dyeing apparatus, is superior to that of known similar compounds made up from dodecyl or oleylethylene diamine and ethylene oxide.

The following examples illustrate the invention. Where not otherwise stated, the parts are given as parts by weight and the temperatures are in degrees centigrade. The relationship of parts by weight to parts by volume is as that of kilogrammes to litres.

Example 1

186 parts of the sodium salt of steryl alcohol monosulphuric acid ester is stirred for 14 hours at 160–170° with 155 parts of diethylene triamine. The yellowish melt obtained is taken up in 350 parts of toluene at 90–100°, the solution is filtered off from the salts which precipitate and the toluene is distilled off at 200 mm. Hg pressure. The diethylene triamine is completely distilled off from the remaining mass at 10 mm. Hg pressure and a bath temperature of 200°. 160–170 parts of a yellowish condensation product remain which solidify into a wax-like mass. The product has strong basic properties and is completely soluble in diluted hydrochloric acid. It consists chiefly of $N_1$-octadecyl-diethylene triamine.

The solution of 2 parts of sodium in 30 parts of ethyl alcohol is added to 178 parts of the condensation product described above at 70° and the ethyl alcohol is removed by slowly raising the temperature to 150°. 440 parts of ethylene oxide are then introduced at 140–150° while working in a closed vessel. The ethylene oxide is taken up in from 20 to 30 hours. 618 parts of a brownish yellow oil are obtained which solidifies on cooling and standing to form a brownish-yellow pasty mass. It dissolves completely in water, has a strong dispersing action and, in acid baths in wool dyeing, it has a very good levelling power.

Example 2

144 parts of steryl chloride are stirred for 3 hours at 95–100° with 155 parts of diethylene triamine and then the salts and the excess diethylene triamine are removed as described in Example 1. 165 parts of a condensation product consisting chiefly of $N_1$-octadecyl-diethylene triamine are obtained.

178 parts of this condensation product are condensed while stirring and excluding air at 140–145° in the presence of a quantity of caustic alkali corresponding to 2 parts of sodium with 330 parts of ethylene oxide. 508 parts of a pale yellow condensation product are obtained which has the same properties as that described in Example 1.

Example 3

153 parts of cetyl bromide are stirred with 155 parts of diethylene triamine at 90–100° for 3 hours. The condensation product is taken up in 300 parts of toluene, the solution is filtered off from the precipitated salts, the solvent and also the excess diethylene triamine are removed by distillation in the vacuum and a condensation product chiefly consisting of $N_1$-hexadecyl-diethylene triamine is obtained in the form of 140 parts of a wax-like yellowish mass.

150 parts of this condensation product are condensed while excluding air at 140–150° with 444 parts of ethylene oxide in the presence of a quantity of caustic alkali corresponding to 2 parts of sodium. 594 parts of a yellow oil are obtained which on standing and cooling solidifies into a pasty yellow mass. The compound dissolves clearly in water and has good emulsifying and levelling properties.

A compound with similar properties is obtained if in the above process, 333 parts of ethylene oxide are used instead of 444 parts of ethylene oxide.

Example 4

167 parts of steryl bromide are condensed with 90 parts of ethylene diamine for 3 hours at 90–100° and 150 parts of a condensation product consisting chiefly of octadecyl ethylene diamine is obtained as described in Example 1.

156 parts of this product are condensed at 140–145° with 440 parts of ethylene oxide in the presence of a quantity of caustic alkali corresponding to 2 parts of sodium. A paste-like yellow oil is obtained which has the same properties as the end product described in Example 1.

A compound with similar properties is obtained if in the above process, 330 parts of ethylene oxide are used instead of 440 parts of ethylene oxide.

Example 5

82 parts of steryl chloride are stirred at 140° for 3–4 hours with 125 parts of triethylene tetramine, and then the excess triethylene tetramine is distilled off in the vacuum. The condensation product which consists chiefly of $N_1$-octadecyl triethylene tetramine is taken up in benzene in order to purify it, filtered off from the chlorohydrate and the benzene is distilled off. After cooling, a pale yellow paste-like base remains which clearly dissolves in diluted hydrochloric acid.

95 parts of this condensation product are condensed while stirring and excluding air at 140–150° in the presence of a quantity of caustic alkali corresponding to 0.5 part of sodium, with 210 parts of ethylene oxide. 305 parts of a pale yellow condensation product which has the same properties as that described in Example 1 are obtained.

A compound with similar properties is obtained if in the above process, 160 parts of ethylene oxide are used instead of 210 parts of ethylene oxide.

Example 6

100 parts of previously wetted wool are entered into a 50–60° warm dyebath which contains, dissolved in 3,000 parts of water: 1 part of the sodium salt of the blue milling dyestuff 4.4'-bis-(4''-amino-anthraquinonyl-(1''')-amino)-diphenylmethane-3''.3''-disulphonic acid, 4 parts of sodium acetate, 2 parts of acetic acid 40% and 0.2 part of the basic polyglycol ether according to Example 1. The bath is brought to the boil within 30 minutes while moving the goods well, and dyeing is performed for half an hour at the boil. A very level, blue wool dyeing is obtained which is fast to rubbing.

Level dyeings are also obtained if in this example instead of the anthraquinone milling dyestuff an azo milling dyestuff is used; for example the tosylated disazo dyestuff made up from tetrazotised benzidine coupled with 2-hydroxynaphthalene-6.8-disulphonic acid and phenol produces very level red wool dyeings.

Example 7

100 parts of previously wetted wool are entered at 85° into a dyebath the pH value of which is 8.0. The bath contains 2,500 parts of permutite water, 1 part of ammonium sulphate, 0.5 part of the complex chromium compound of the dyestuff made up from diazotised 4-methylsulphonyl-2-amino-1-hydroxybenzene and 1-acetylamino-7-hydroxynaphthalene and 0.2 part of the basic polyglycol ether according to Example 2. The bath is brought to the boil within 15 minutes while moving the goods well and boiled for a further 30 minutes. A very level grey wool dyeing is obtained.

Similar level wool dyeings are obtained if in the above example 0.5 part of the complex chromium compound of the dyestuff made up from diazotised 2-amino-1-hydroxybenzene-4-sulphonic acid methylamide and 1-(4'-chlorophenyl)-3-methyl-5-pyrazolone, or mixtures of these dyestuffs are used to produce fashionable shades for example, a very level brown dyeing is obtained with 0.3 part of the first named chromium containing dyestuff, 0.45 part of the second chromium containing dyestuff and 0.2 part of the chromium containing dyestuff made up from diazotised 5-methyl-sulphonyl-2-amino-1-hydroxybenzene and 1-(4'-chlorophenyl)-3-methyl-5-pyrazolone.

What I claim is:

1. A basic polyglycol ether obtained by reacting 1 mol of a polyamine of the general formula:

$$A-NH-(CH_2-CH_2-NH)_n-CH_2-CH_2-NH_2$$

wherein A represents a straight chain alkyl radical of 16–18 carbon atoms and $n$ is an integer from 1–2 inclusive, with 15 to 20 mols of ethylene oxide.

2. A basic polyglycol ether obtained by reacting 1 mol of $N_1$-octadecyl-diethylene triamine with 20 mols of ethylene oxide.

3. A basic polyglycol ether obtained by reacting 1 mol of $N_1$-octadecyl-diethylene triamine with 15 mols of ethylene oxide.

4. A basic polyglycol ether obtained by reacting 1 mol of $N_1$-hexadecyl-diethylene triamine with 20 mols of ethylene oxide.

5. A basic polyglycol ether obtained by reacting 1 mol of $N_1$-octadecyl-triethylene tetramine with 20 mols of ethylene oxide.

References Cited in the file of this patent

UNITED STATES PATENTS

| | | |
|---|---|---|
| 2,214,352 | Schoeller et al. | Sept. 10, 1940 |
| 2,233,383 | De Groote et al. | Feb. 25, 1941 |

FOREIGN PATENTS

| | | |
|---|---|---|
| 667,744 | Germany | Nov. 19, 1938 |